US012309437B2

(12) United States Patent
Agoston et al.

(10) Patent No.: US 12,309,437 B2
(45) Date of Patent: *May 20, 2025

(54) ENHANCED SCREEN SHARE FOR ONLINE COMPUTER APPLICATIONS

(71) Applicant: Sony Interactive Entertainment Inc., Tokyo (JP)

(72) Inventors: Steve Agoston, Hermosa Beach, CA (US); Michael Raymond Starich, Mission Viejo, CA (US); William Scott Watson, Mission Viejo, CA (US); Joseph Hiroshi Kimura, Orange, CA (US); Corbin J. Percy, San Clemente, CA (US); Akshay V. Rao, Aliso Viejo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 18/380,579

(22) Filed: Oct. 16, 2023

(65) Prior Publication Data
US 2024/0048781 A1 Feb. 8, 2024

Related U.S. Application Data

(63) Continuation of application No. PCT/US2023/022854, filed on May 19, 2023, and a
(Continued)

(51) Int. Cl.
*H04N 21/2187* (2011.01)
*G06F 3/14* (2006.01)
(Continued)

(52) U.S. Cl.
CPC ....... *H04N 21/2187* (2013.01); *G06F 3/1454* (2013.01); *H04N 21/4312* (2013.01); *H04N 21/4788* (2013.01)

(58) Field of Classification Search
None
See application file for complete search history.

(56) References Cited

U.S. PATENT DOCUMENTS 8,559,516 B2 * 10/2013 Hardacker ............. G11B 27/28
375/240.16
9,195,880 B1 * 11/2015 Levoy .................... G06V 20/30
(Continued)

OTHER PUBLICATIONS

"Typical Software Architecture" ebrary.net, Academic library 2014-2022, Available at: https://ebrary.net/22045/computer_science/typical_software_architecture, (Accessed: 2022).
(Continued)

*Primary Examiner* — Quang N Nguyen
(74) *Attorney, Agent, or Firm* — Kilpatrick Townsend & Stockton LLP

(57) ABSTRACT

In a method and system for viewer interaction with streaming media, a scene from a media presentation is displayed with a broadcasting device that includes an operating system level broadcaster interface overlay. The overlay generates an image frame from the scene. The image frame is sent to a viewer device. Viewer interaction parameters are received from a viewing device and a viewer interaction is displayed over a subsequent scene from the media presentation with the broadcaster interface overlay. On a viewing device an image frame from the media presentation is received from the broadcasting device. An operating system level viewer interface overlay is generated over the image frame and the image frame of the media presentation is displayed. Viewer interaction parameters are generated from a viewer interaction with the operating system level viewer interface overlay and sent to the broadcasting device.

18 Claims, 10 Drawing Sheets

Related U.S. Application Data continuation of application No. 17/852,993, filed on Jun. 29, 2022, now Pat. No. 11,792,443, said application No. PCT/US2023/022854 is a continuation of application No. 17/852,993, filed on Jun. 29, 2022, now Pat. No. 11,792,443.

(51) Int. Cl.
  *H04N 21/431* (2011.01)
  *H04N 21/4788* (2011.01)

(56) References Cited

U.S. PATENT DOCUMENTS

| | | |
|---|---|---|
| 10,410,376 B1 | 9/2019 | Waggoner et al. |
| 10,785,512 B2 | 9/2020 | Kambhatla et al. |
| 11,792,443 B1 | 10/2023 | Agoston |
| 2009/0271821 A1* | 10/2009 | Zalewski ............... H04N 5/445 725/37 |
| 2018/0081509 A1 | 3/2018 | Varela et al. |
| 2019/0273954 A1 | 9/2019 | Evans |
| 2021/0099759 A1 | 4/2021 | Armstrong et al. |
| 2022/0132212 A1 | 4/2022 | Moehrle |
| 2022/0138902 A1 | 5/2022 | Lea |
| 2022/0207804 A1 | 6/2022 | Collins et al. |

OTHER PUBLICATIONS

International Search Report and Written Opinion for International Application No. PCT/US2023/022854, dated Oct. 10, 2023.
Notice of Allowance for U.S. Appl. No. 17/852,993, dated Jun. 28, 2023.

* cited by examiner

ENHANCED SCREEN SHARE FOR ONLINE COMPUTER APPLICATIONS

CLAIM OF PRIORITY

This application is a continuation of U.S. patent application Ser. No. 17/852,993 filed Jun. 29, 2022, the entire contents of which are incorporated herein by reference. This application is a continuation of International Patent Application Number PCT/US2023/022854 filed May 19, 2023, the entire contents of which are incorporated herein by reference. International Patent Application Number PCT/US2023/022854 is a continuation of U.S. patent application Ser. No. 17/852,993 filed Jun. 29, 2022.

FIELD OF THE DISCLOSURE

Aspects of the present disclosure relate to streaming video, specifically aspects of the present disclosure are related to adding viewer to broadcaster interaction to streaming video.

BACKGROUND OF THE DISCLOSURE

Streaming of media presentations, such as video games, movies and TV shows has become popular. Streaming websites such as Twitch and Facebook gaming are gaining increasing popularity. A unique aspect of streaming websites is interaction with the broadcaster. Generally, interactions of the viewer with the broadcaster with streaming websites is limited to applications running in tandem with the media presentation on the broadcasting device. As such any interaction features of the streaming application must be made compatible with the media presentation on a case-by-case basis. Thus, the most common interactions between viewers and a broadcaster are through a chat window. Broadcasters generally have multiple monitors and, in some cases, multiple devices for broadcasting the media presentation and interacting with viewers.

A broadcaster may have one monitor displaying the media presentation on a first application and a second monitor displaying user interactions on a second application. Here, the viewer interactions do not appear on the media presentation itself but instead on a second application which may include text or voice chat functions. The second application may also display a streaming window which displays captured image frames from the media presentation. The streaming window may also include user interactions in the image frames. Meanwhile the media presentation itself runs without any interactions from the user. In cases where the media presentation is a video game or other mentally taxing application, the broadcaster's full attention may be taken up by the media presentation on the first display and may be unable to look at a second display or application for user interaction. Additionally, there is often a large delay (e.g., one second to tens of seconds) between the media presentation and interactions displayed by the second application. In some cases, this delay is intentional to prevent cheating in multiplayer games but often it is due to system or network latency. Thus, it would be advantageous for user interactions to be displayed directly on a broadcaster's media presentation with low latency. It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Viewer interaction is a major draw for many viewers of streaming media. Viewers enjoy chatting with their favorite media broadcasters (also known as "Streamers") in text chat or voice chat. Sometimes a streamer will ask their viewers for help on a media presentation such as a video game. The help from their viewers is often limited to text-based explanations or explanations over voice chat. Some applications have integration with streaming video platforms allowing specific user interactions enabled by application programming. There is currently no way to user interactions to media presentations that are not specifically designed to accommodate those interactions.

Additionally streaming media presentations has also become common between smaller friend groups. Oftentimes friends will stream media presentations with each other to share a new game, or get help on a game; friends may sometimes hold movie nights. It would be useful for friends to be able to help other friends with on-screen interactions such as arrows, circles, boxes, zoom-in areas, free-form lines and on-screen text messages.

Aspects of the present disclosure add application agnostic, low system latency, viewer interactions, to broadcaster media presentations. Operating system level media presentation streaming, and interaction overlay code may be used to provide application agnostic interaction and decreased latency.

Figure 1:
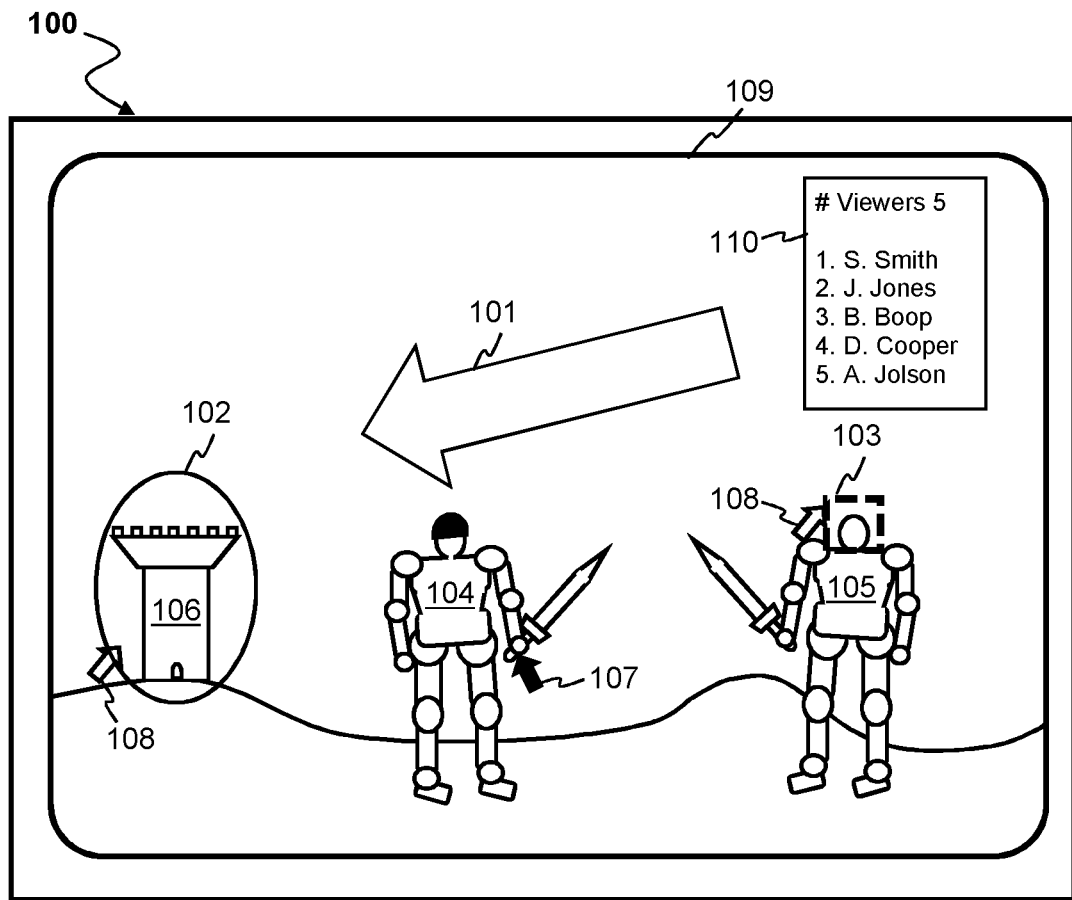
FIG. 1 is a diagram of a broadcaster's screen with viewer interactions including circle, box, arrow, and cursor functions in the broadcaster's interaction overlay according to an aspect of the present disclosure.

FIG. 1 is a diagram of a broadcaster's screen with viewer interactions including circle, box, arrow, and cursor functions in the broadcaster's interaction overlay according to an aspect of the present disclosure. Depicted is a display screen 109 of a broadcasting device 100. The display screen 109 displays a media presentation. In this example the media presentation includes a first knight 104 and a second knight 105 and a castle 106. An operating system level broadcaster interface overlay generates viewer interactions 101, 103, 108, 102 from viewer interaction parameters and displays the viewer interactions over the media presentation. In some implementations, the broadcaster interface overlay can also provide viewer information 110 to the broadcaster, such as the number of viewers actively watching the media presentation and the viewer names. By way of example and not limitation, this information can be presented to the broadcaster on a sidebar of the display screen. This broadcaster-specific information is only visible to the broadcaster and is not available in the layer of video that is sent to the viewer and is therefore not presented on a viewer's device. In this example, the viewer interactions include placement of a large arrow 101, pointing towards the castle 106, an ovoid 102 around the castle 106 and a square 103 highlighting a weak spot of the second knight 105. The square 103 or ovoid 102 here may be filled with a semi-transparent or semi-opaque color. Such color may be uniquely associated with a particular viewer who generated the particular viewer interaction. The square 103 or ovoid 102 may be outlined in an opaque color, semi-opaque or semi-transparent color. Additionally, the broadcaster's interface overlay may display viewer cursors 108 over the media presentation. The viewer's cursor(s) 108 may be displayed in a different color than the broadcasting device cursor 107 or may be semi-transparent. Here, a media presentation includes, without limitation, video games, movies, TV shows, streamed video or pictures. Here, a viewer interaction means information containing interaction parameters sent from a second device receiving image frames (also referred to as streaming) from a media presentation displayed on a first device. Although viewer interactions could be associated with a graphical user interface, aspects of the present disclosure are not limited to such implementations alone. In alternative implementations, the viewer interactions could be associated with something else, such as a touchscreen, gamepad, or other peripheral (e.g. a customizable control panel). The interaction parameters may include an interaction type, e.g., arrow, square or ovoid, for display on the broadcaster's interaction interface overlay and locations of the interaction. By way of example, and not by way of limitation, the locations of a viewer's interactions may be determined from inputs by the viewer to a graphical user interface associated with the viewer's device.

Figure 2:
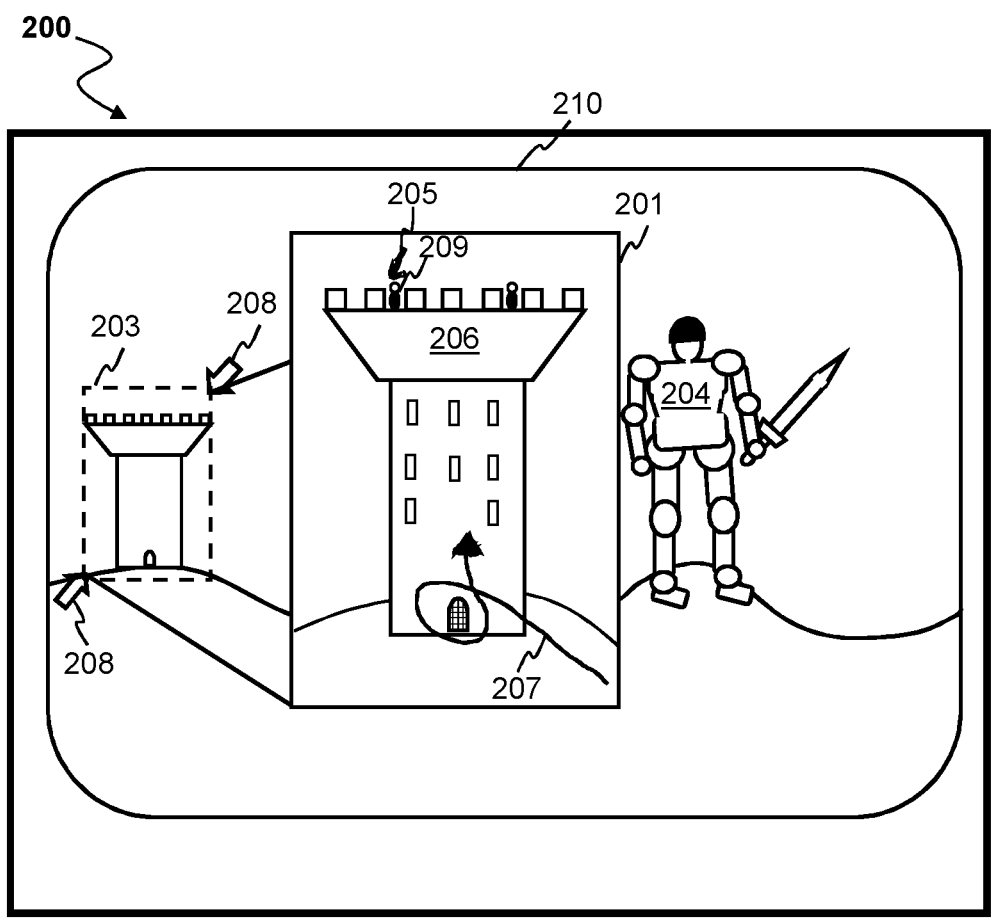
FIG. 2 is a diagram of a broadcaster's screen with viewer interactions including zoom and free form line functions in the broadcaster's interaction overlay according to an aspect of the present disclosure.

FIG. 2 is a diagram of a broadcaster's screen with viewer interactions including zoom and free form line functions in the broadcaster's interaction overlay according to an aspect of the present disclosure. The broadcaster's interaction overlay is displaying a zoom 201 function and free form line 207, 209 and cursor 208, viewer interactions according to aspects of the present disclosure.

Here the zoom function 201 may be activated by a viewer performing a 'pinch to zoom' function with their cursors 208. A square or other shape may be displayed over the area of the broadcaster's interaction interface that is being zoomed. The zoom 201 function may use pixel values from the media presentation in the zoom area 203 and apply an upscaling algorithm to the pixel values from the media presentation in the zoom area to upscale the image. The upscale image may be displayed by the broadcaster's interaction interface overlay, over the original location 203 or in a second location 201. The upscaling algorithm may be for example and without limitation, nearest neighbor interpolation, bicubic or bilinear scaling, sinc or lanczos resampling, box sampling, Fourier-transform based interpolation, edge directed interpolation, hqx, and similar. In some implementations the upscaling algorithm may apply machine learning based approaches.

Additionally other user interactions may be displayed by the broadcaster's interaction interface such as a free form arrow 207 or freeform line 205 or viewer cursors 208. The viewer's interactions may also be combined with the zoom function. As shown here the free form arrow 207 is drawn over the zoomed in castle tower 206 and the free form line 205 is drawn in the zoomed in area 201. Here, the zoom function reveals a person on the rampart that may have been too small for the broadcaster to see without the function. The free form line 205 and free form arrow 207 may be drawn by the same viewer who performed the zoom function or a different viewer. The zoom function may continue for as long as a viewer holds the pinched zoom 208 or the zoom may be on a timer. The zoom timer may have a length that is viewer selectable or broadcaster selectable.

Figure 3:
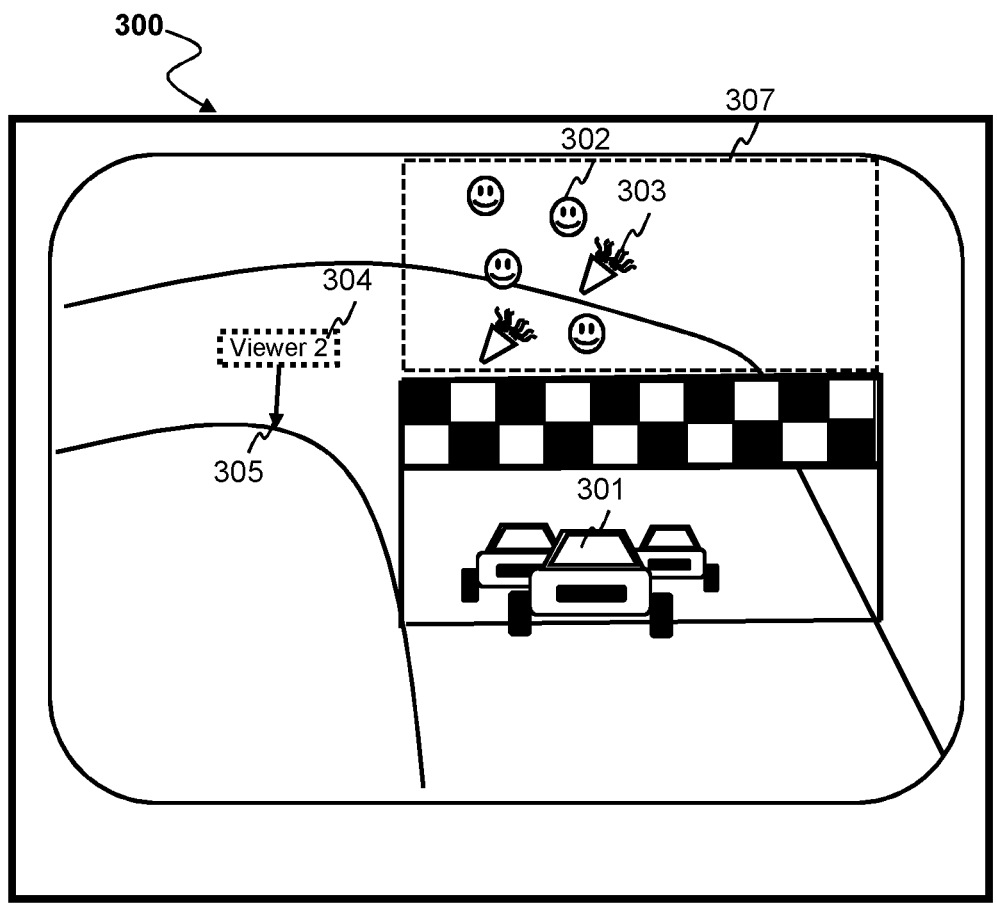
FIG. 3 is a diagram of a broadcaster's screen with viewer interactions including emoji, emoticon and text functions in the broadcaster's interaction overlay according to an aspect of the present disclosure.

FIG. 3 is a diagram of a broadcaster's screen with viewer interactions including emoji, emoticon and text functions in the broadcaster's interaction overlay according to an aspect of the present disclosure. In this implementation the broadcaster is playing a media presentation that is a racing game. The broadcaster's car 301 has won the race, to show their support and enthusiasm viewers may be able to place emoticons or emojis directly on the media presentation of the broadcasting devices using the broadcaster's interaction interface overlay. In some implementations, the broadcaster's interaction interface overlay may give the broadcaster the option to disable certain types of emojis or emoticons that are available for the viewers. Alternatively, the broadcaster's interaction interface overlay may allow the broadcaster to provide a custom emoticon for use by the viewers. The broadcaster may have interaction controls that allow the broadcaster to designate regions 307 of the broadcaster interaction interface overlay where viewer interaction may be displayed, additionally the broadcaster may choose the types of viewer interactions that are allowed to be displayed in the broadcaster's interaction interface overlay. This allows the broadcaster to avoid intrusive or unwanted viewer interactions. Here, the broadcaster has designated the region 307 for viewer interactions and the viewers have placed smiley 302 and party popper 303 emoticons in the designated region 307. The broadcaster here has also allowed viewer created text boxes 304 and arrows 305 outside the designated region 307.

In some implementations, the broadcaster's interaction interface overlay may allow the broadcaster to control other types of unwanted interactions, e.g., undesired interactions from bad-actor viewers. In some implementations, the broadcaster's interaction interface overlay may allow the broadcaster to prioritize interactions, e.g., by giving higher priority to interactions by VIP viewers or friends or influencers. In some implementations interactions may be prioritized based on the popularity of the feedback provider so their feedback appears before other feedback providers. In other implementations, some feedback may be excluded if the volume of feedback sufficiently high. In such situations, the system may create an alternative view of feedback, e.g., for "top feedback only". Furthermore, the broadcaster may have the option to selectively disable viewer interactions for some or all viewers, e.g., if they think the feature is blocking their view of the media presentation, or if they wish to allow it only for a limited group of friends or subscribers on the platform.

Figure 4A:
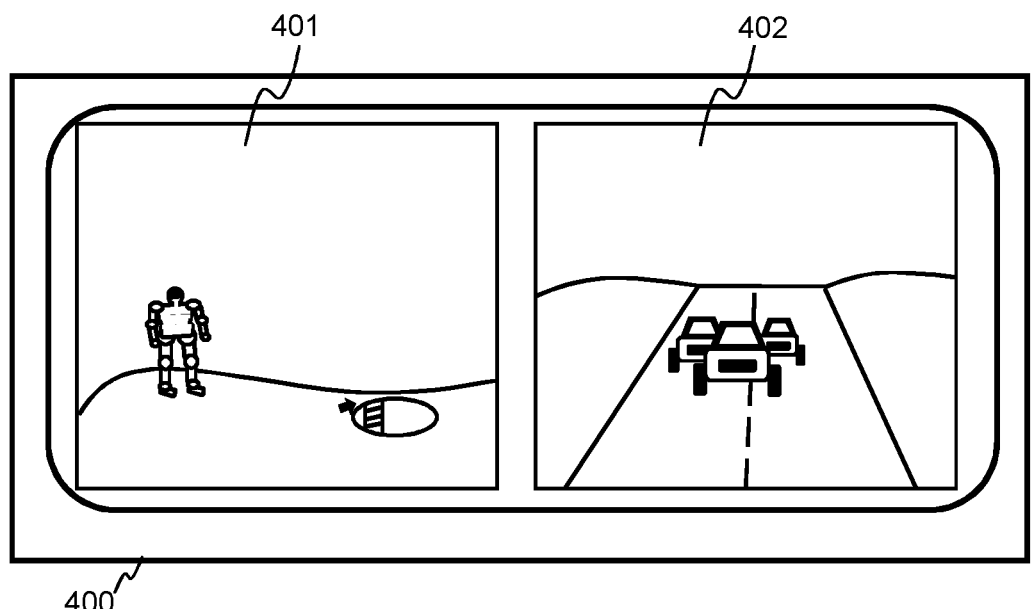
FIG. 4A is a diagram depicting a display screen with viewer interaction in picture-by-picture mode according to an aspect of the present disclosure.

FIG. 4A is a diagram depicting a display screen with viewer interaction in picture-by-picture mode according to an aspect of the present disclosure. As shown a media presentation 401 may be playing on a viewer device 400 and a frame 402 of a media presentation from a broadcasting device. The viewer's media presentation 401 is displayed on the viewer's device 400 side by side with frames 402 of a media presentation from a broadcasting device. Here the viewer's media presentation 401 may be display at an equal window size or resolution as the frames from the broadcasting device 402. In FIG. 4A the window size or resolution of the Viewer's media presentation 401 is shown equal to the frames from the broadcasting device 402 but aspects of the present disclosure are not so limited, a viewer media presentation of any size or resolution may be displayed next to frames from the broadcasting device of any size or resolution. Such a display configuration may allow a viewer to quickly interact with a broadcaster's stream by moving their cursor into the window of image frame from the broadcasting device as will be discussed in a later section.

Figure 4B:
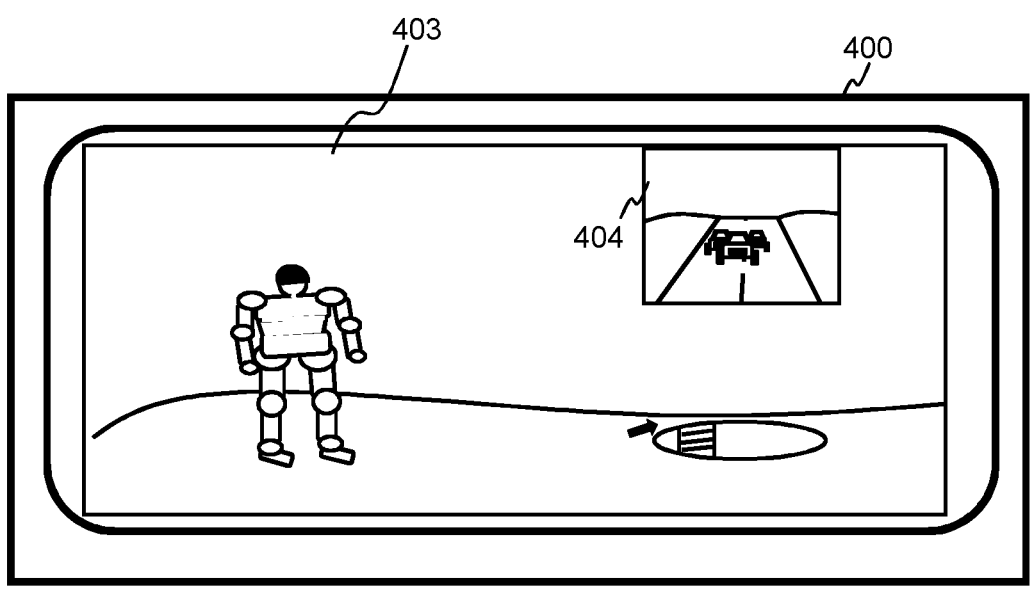
FIG. 4B is a diagram showing a display screen with viewer interaction in picture in picture mode according to an aspect of the present disclosure.

FIG. 4B is a diagram showing a display screen with viewer interaction in picture in picture mode according to an aspect of the present disclosure. Here the viewer's media presentation 403 on the viewer device 400. The image frame 404 from the broadcasting device is displayed within the viewer's media presentation 403. The image frame 404 from the broadcasting device is in a smaller window or a lesser resolution than the viewer's media presentation 403. Display of the image frame 404 from the broadcasting device within the viewer's media presentation 403 allows for more display screen space to be provided to the viewer's media presentation while still allowing the viewer to see and interact with the image frame 404 from the broadcasting device. While implementations are discussed with respect to displaying the image frame from the broadcasting device within the viewer's media presentation aspects of the present disclosure are not so limited. In alternative implementations the viewer's media presentation may be displayed within the image frames from the broadcasting device.

Figure 5:
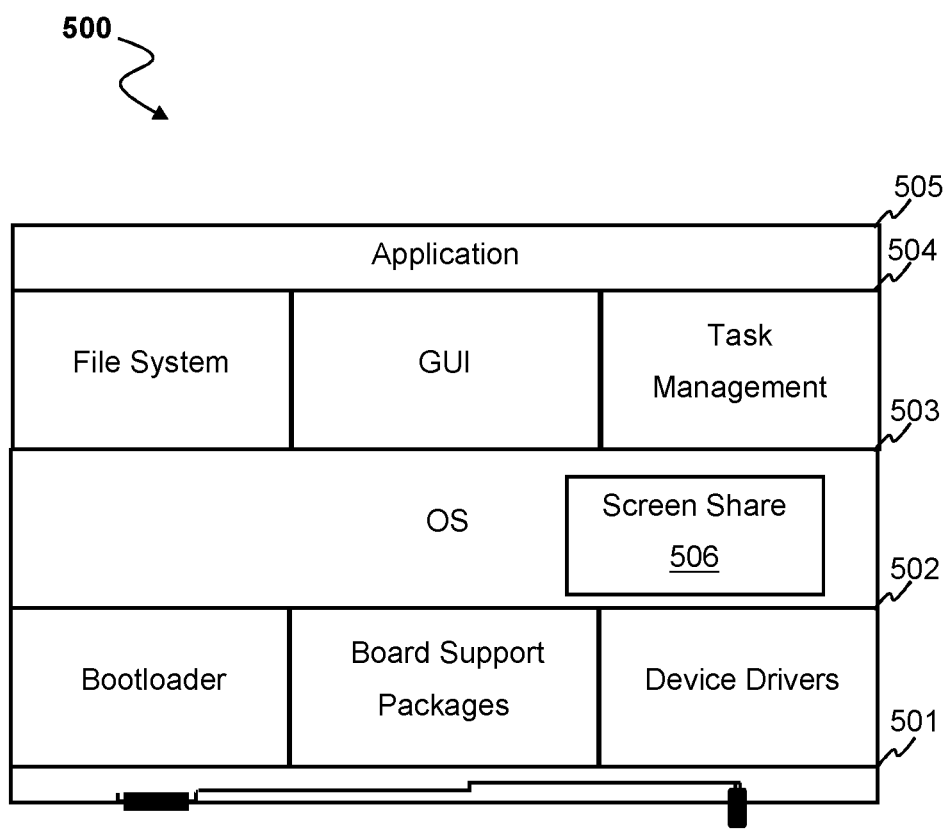
FIG. 5 is a block diagram showing a computer system operation control stack including screen share according to an aspect of the present disclosure.

FIG. 5 is a block diagram showing a computer system operation control stack including screen share according to an aspect of the present disclosure. Here, levels of software and firmware stack in a computer system 500. At the base level 501 is hardware with circuitry, resistors, capacitors, transistors, transformers and the like configured to form a general-purpose computing device. Above the hardware level is the hardware abstraction layer 502. The hardware abstraction layer 502 level interacts with the base hardware and further is configured to operate with higher level software during the operation of the general-purpose computer. The hardware abstraction layer may include Bootloaders which load operating systems into hardware memory, board support packages that enable the generalized operation of hardware functions by higher level software, and device drivers that enable operation of hardware components and devices that may be plugged into the hardware. The hardware components and devices may include keyboards, mice, joysticks, graphics cards, displays etc. The next level is the Operating System (OS) level 503. The Operating system here includes a Screen Share plus feature 506 that facilitates interactions between viewers and a broadcaster as discussed herein. The operating system 503 communicates with the hardware abstraction layer 502 to allow operation of higher-level software. The OS includes automation of support operations in the hardware abstraction layer in the form of services. These support operations may include, for example and without limitation, Scheduling, file synchronization and networking. Here, screen share plus feature 506 operates at the OS level allowing generalized support throughout the system architecture without the need for specialized application integration.

The next layer is the system service layer 507, which provides a service interface to the operating system 503 for the application layer 508. The system service layer may include a file system which indexes files stored in hardware by the operating system, Graphical User Interface (GUI) which provides a graphical representation of the services provided by the OS 503 and allows a user to more easily operate the general-purpose computers and task management which manages services provided by the OS. Finally, the Application layer 508 uses services from the OS provided by the system service layer to generate additional computer functionality separate from the OS. Applications run at a less privileged state than the operating system and generally require an application programming interface API to interact with the OS. Generally, unless specifically programmed applications do not interact with other applications unless it is through the OS layer. The provision of screen-sharing native to the OS layer allows the general-purpose use of screensharing without the use of specialized application or customization of applications for screen sharing.

Figure 6:
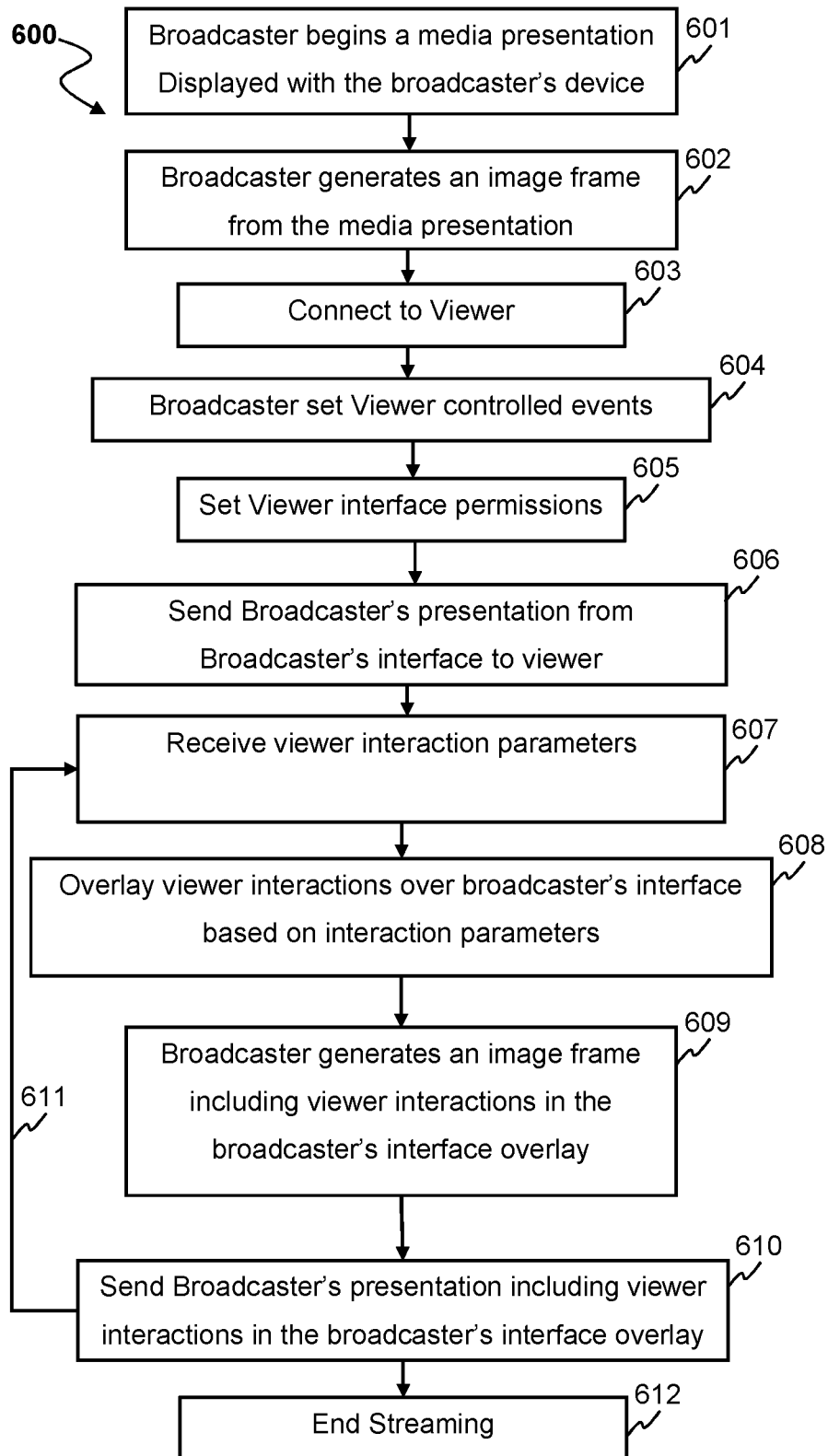
FIG. 6 is a flow diagram showing a method for viewer interaction on a broadcasting device according to an aspect of the present disclosure.

FIG. 6 is a flow diagram showing a method for viewer interaction on a broadcasting device according to an aspect of the present disclosure. By way of example, and not by way of limitation, such a method may be implemented fully or partially by an operating system feature, such as the Screen Share Plus feature 506 discussed above. Initially, the broadcasting device may begin a media presentation that is displayed to the broadcaster at 601. The media presentation may be for example and without limitation, a video game, movie, TV show, streamed video or picture. The broadcaster may initiate streaming of the media presentation. As part of streaming the media presentation the broadcasting device generates an image frame from the media presentation, as indicated at 602. The image frames may be generated before or after a viewer connects with the broadcasting device at 603. The connection with the viewer may be facilitated by the use of a streaming server which may receive frames from the broadcasting device and pass those frames to connected viewing devices. For the purposes of this document this may be considered a connection of the viewing device with the broadcasting device. In addition to passing frames from broadcaster to viewer, the streaming server may also transcode alternative resolutions that the broadcaster may not be providing.

After a connection has been established with a viewing device the broadcaster may enable viewer-controlled events at 604. If viewer-controlled events are not enabled, the broadcasting device may not display viewer interactions even if viewer interaction parameters are received. A message may also be sent to the viewing device informing it that viewer-controlled events are enabled on the broadcasting device. The broadcasting device may include enable able limitations on the types of viewer interactions and placement of viewer interactions on the broadcasting device display. The broadcasting device may have user-controlled settings that control the placement of viewer interaction and type of user interactions at 605. After a connection has been established with the viewing device, the broadcasting device may send an image frame to the viewing device at 606. In some implementations image frames may be sent to a streaming server which then sends image frames to the viewing device.

After sending an image frame to a viewing device, the viewing device may generate viewer interaction parameters from interactions by the viewer with the image frame. These viewer interaction parameters may be sent back to the broadcasting device, where they are received by the broadcasting device at 607. In alternative implementations the viewing device may send the viewer interaction parameters to a streaming server and the streaming server sends the viewer interaction parameters to the broadcasting device. The broadcaster interface overlay may take the viewer interaction parameters and overlay the interactions over the media presentation at 608. Here, user interaction parameters may include, for example and without limitation, an interaction type and/or an interaction location. The interaction type may for example and without limitation describe the displayed interaction, e.g., a zoom, arrow, free form line, cursor etc. The interaction location may describe the location of the interaction in the media presentation e.g., a pixel location or coordinate grid location of the interaction or portions of the interaction (such as height, width, center, radius, diameter, edge locations etc.). By way of example, and not by way of limitation, interaction type and the locations of a viewer's interactions may be determined from inputs by the viewer through graphical user interface software and/or hardware associated with the viewer's device.

The viewer interactions may be displayed back to the viewer. This may allow the viewer to more easily understand broadcaster commentary or actions. The broadcasting device may generate subsequent image frames that include the viewer interactions from the broadcaster's interaction interface overlay, as indicated at 609. The subsequent image frame may be generated from a subsequent scene of the media presentation or a frame that is currently displayed on the broadcasting device as long as the frame index is always advancing, to avoid sending a frame more than once. These subsequent image frames may then be sent to the viewing device at 610. The viewer may then interact with the subsequent image frame(s) and send the interaction parameters to the broadcasting device repeating at 611 back to step 607 and through the rest of the method steps 608-610. Alternatively, the broadcaster may end streaming the media presentation at 612.

Figure 7:
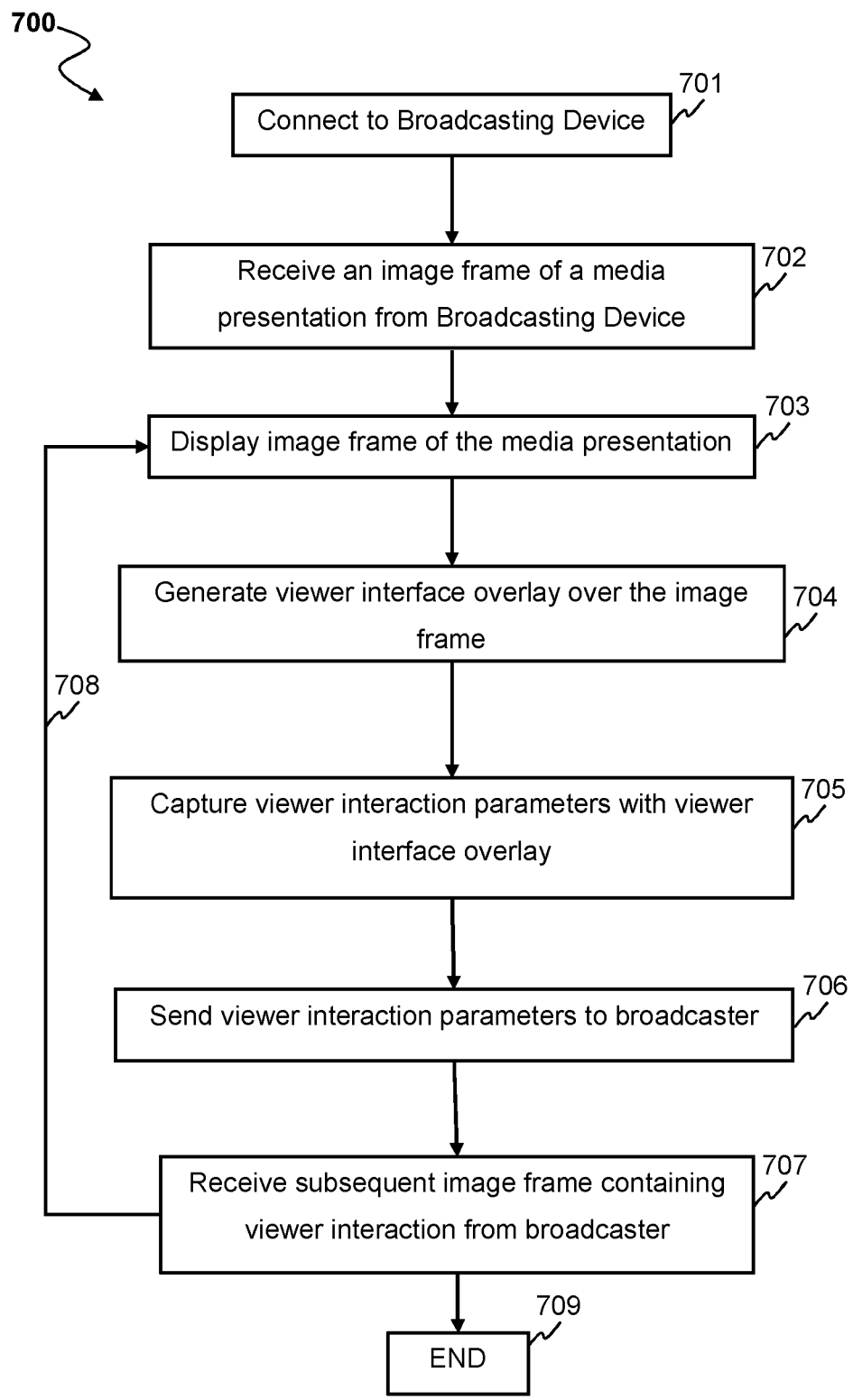
FIG. 7 is a flow diagram showing a method for viewer interaction on a viewer device according to an aspect of the present disclosure.

FIG. 7 is a flow diagram showing a method 700 for viewer interaction on a viewer device according to an aspect of the present disclosure. By way of example, and not by way of limitation, such a method may be implemented fully or partially by an operating system feature, such as the Screen Share Plus feature 506 discussed above. The viewing device may initially connect to a broadcasting device at 701. Alternatively, the viewing device may connect to broadcasting device through a streaming server which receives communications from the viewing device and sends the communications to the broadcasting device, e.g., via cloud-based streaming server. The broadcasting device may send an image frame from a media presentation to the viewing device. Subsequently the viewing device may receive the image frame at 702. Additionally, the viewing device may receive information from the broadcasting device indicating that interactions are enabled or that locations where viewer interactions are enabled or types of viewer interactions are allowed.

The image frame from the media presentation on the broadcasting device is displayed on the viewing device at 703. Additionally, a viewer interaction interface overlay is generated over the image frame at 704, this may occur concurrently with display of the image frame or before the image frame is displayed or after the image frame is displayed. The viewer interaction interface overlay may be invisible to the user or may display types of interactions the user may place within the image frame. In any case the viewer interaction overlay captures the viewer's interactions with the image frames and translates those interactions into interaction parameters at 705. By way of example, and not by way of limitation, the interaction overly may include a graphical user interface software and/or hardware associated with the viewer's device that allows the viewer to determine interaction parameters such as the interaction type and the interaction location.

The interaction parameters are then sent to the broadcasting device at 706. As discussed above the broadcasting device may include the user interaction in a subsequent image frame. That subsequent image frame including the viewer interaction is then transmitted to and received by the viewer device at 707. The subsequent image frame may then be displayed at 703, repeating at 708 the steps 704, 705, 706, 707 until the viewer or broadcaster ends streaming or stops allowing viewer interactions 709.

Figure 8:
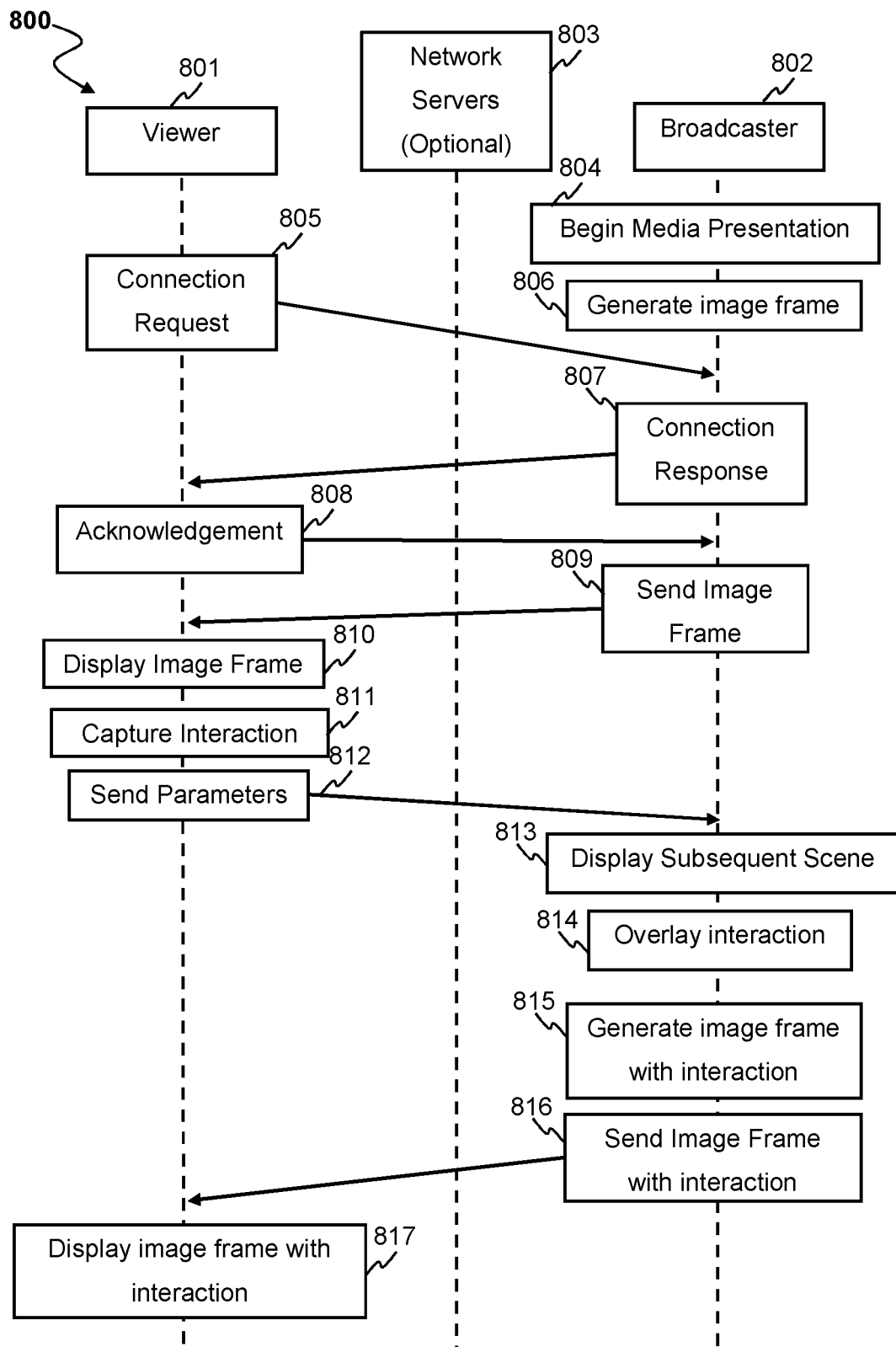
FIG. 8 is a timing diagram showing the operation of viewer device and broadcasting device according to an aspect of the present disclosure.

Interaction between the viewer and broadcaster according to aspects of the present disclosure may be understood by referring to the timing diagram depicted in FIG. 8. In the illustrated timing diagram communication 800 between a broadcasting device 802 and a viewing device 801 through a network 803 is shown. The network 803 may include network servers and/or streaming servers that pass communications from the broadcasting device 802 and pass them to the viewing device 801 and/or pass communications from the viewing device to the broadcasting device. Additionally, in some implementations, one or more network servers or streaming servers may provide other services such as viewer authentication, secure communication, payment processing and similar services. As discussed above, initially the broadcasting device 802 may begin displaying a media presentation at 804. The broadcasting device may generate an image frame at 806 from the media presentation for streaming. The viewing device 801 may request a connection with the broadcasting device at 805. In response to receiving a connection request from the viewing device, the broadcasting device 802 may send a connection response at 807. The connection response may include such information as, for example and without limitation, a connection address and port number. In an alternative implementation the connection request may be facilitated by one or more network servers, which may route connection requests or which the viewer device may form an independent connection. Once a connection response is received the viewing device may send an acknowledgement message at 808 using the information contained within the connection response.

Once communication has been established with the viewing device 801, the broadcasting device 802 sends image frames to the viewing device at 809. The viewing device displays the image frames from the broadcasting device at 810. The viewing device may provide a viewer interaction overlay over the displayed image frames. Using the viewer interaction overlay, the viewing device may capture the viewer's interaction at 811 and translates the interaction into interaction parameters. The interaction parameters are then sent to the broadcasting device at 812. The broadcasting device 802 may generate a subsequent scene from the media presentation and display the subsequent scene at 813. Over the subsequent scene, the viewer interactions may be displayed and overlaid at 814 using the viewer interaction parameters. The broadcasting device 802 may then generate an image frame for streaming to the viewing device that includes the viewer overlaid interactions at 815. Including the viewer interaction in a subsequent image frame may allow viewers to understand the context of a broadcaster's action and also understand that their interactions are received by the broadcasting device and displayed on the broadcasting device. Broadcaster-specific information, e.g., number and names of viewers may be omitted from the image generated by the broadcasting overlay. The subsequent image frame including viewer interaction is sent to the viewer device at 816. The viewer device may display the image frame including the viewer interactions at 817 but omitting any broadcaster-specific information.

Figure 9:
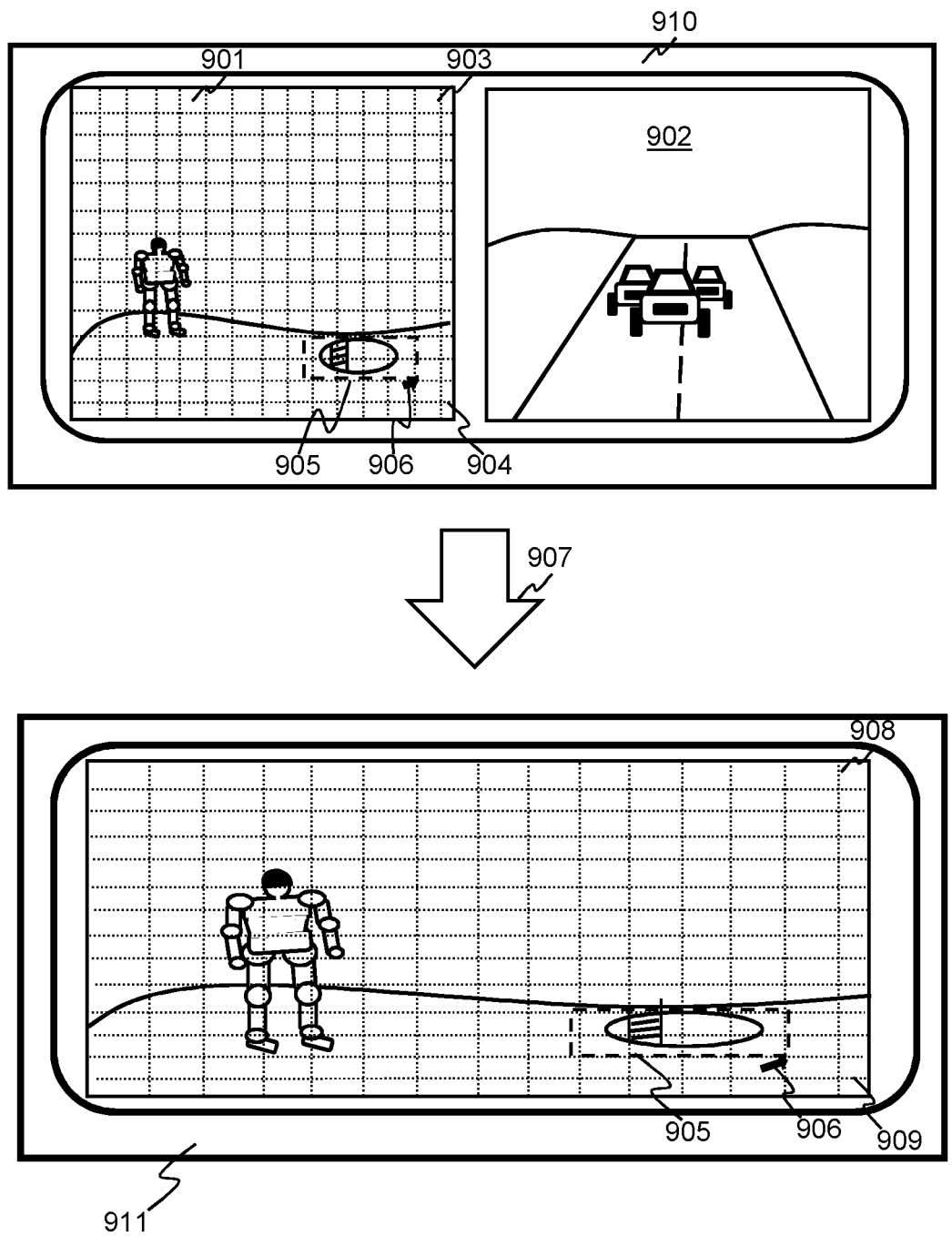
FIG. 9 is a diagram showing the transformation of user interactions on a viewer interface overlay to a broadcasting device interface overlay over the media presentation according to an aspect of the present disclosure.

FIG. 9 is a diagram showing the transformation of user interactions on a viewer interface overlay to a broadcasting device interface overlay over the media presentation according to an aspect of the present disclosure. The viewing device 910 in this implementation displays a viewer's media presentation 902 and image frames 901 from a broadcasting device. A viewer interface overlay may capture viewer interaction with the image frame. Here the viewer interactions may be captured through a grid having X gridlines 904 and Y gridlines 903. Alternatively, pixel locations may be used to capture the viewer interactions. The viewer interaction shown here is a square 905 drawn around an area of interest for the viewer in the image frame, e.g., using graphical interface hardware and/or software. Additionally, a viewer's cursor 906 location may be captured as a user interaction. The location and type of the user interaction (known as viewer interaction parameters) may be captured using the X coordinates 904 and Y coordinates 903 coordinates or pixel locations determined from the viewer interaction overlay. The viewer interaction parameters may be sent to a broadcasting device 911 via a network 907. As the image frame from the broadcasting device is displayed in a smaller window or a reduced resolution compared to the broadcasting device's media presentation, a transform may be applied to change the viewer interaction parameters from the viewer device 910 to the broadcasting device 911. The transformed viewer interaction parameters may then be used to display the user interaction 910. The transform may include for example and without limitation, a grid or pixel coordinate offset, a coordinate multiplier, divider or similar. The transform may be used to deal with things such as different resolutions between broadcaster and viewer or different viewing devices. Furthermore, the transform may address the need for an offset due to off-grid clicking resulting from different aspect ratios at the broadcaster and view devices. As shown the X 909 and Y 908 grid or pixel coordinates have been transformed to fit the broadcaster's interaction overlay 908, 909 of the broadcasting device 911. Additionally, the viewer's cursor 906 is displayed through the Broadcaster's interface overlay.

In some implementations, it may be possible for the locations of user interactions to follow the locations of objects within the image frame. For example, in FIG. 9 the square 905 in the images on the broadcaster and viewer devices could follow the hole with the ladder as the knight moves. To accomplish this, certain information may be captured from the viewer side for certain actions and passed to the broadcaster to maintain accuracy as the location of the selected object is pinpointed on the Broadcaster side. For instance, the system can capture the location of the viewer's cursor 906 and pass the viewer side pixel coordinates and color information (for the small pixel grid) obtained on the viewer side. Once the broadcaster device 911 receives the cursor information it can attempt to match the color and the pixel coordinates within a threshold area to increase accuracy. Upon failing to meet the predictive attempt of coordinate radius color matching, the broadcaster's device 911 could render using only the pixel coordinates as a fallback.

Figure 10:
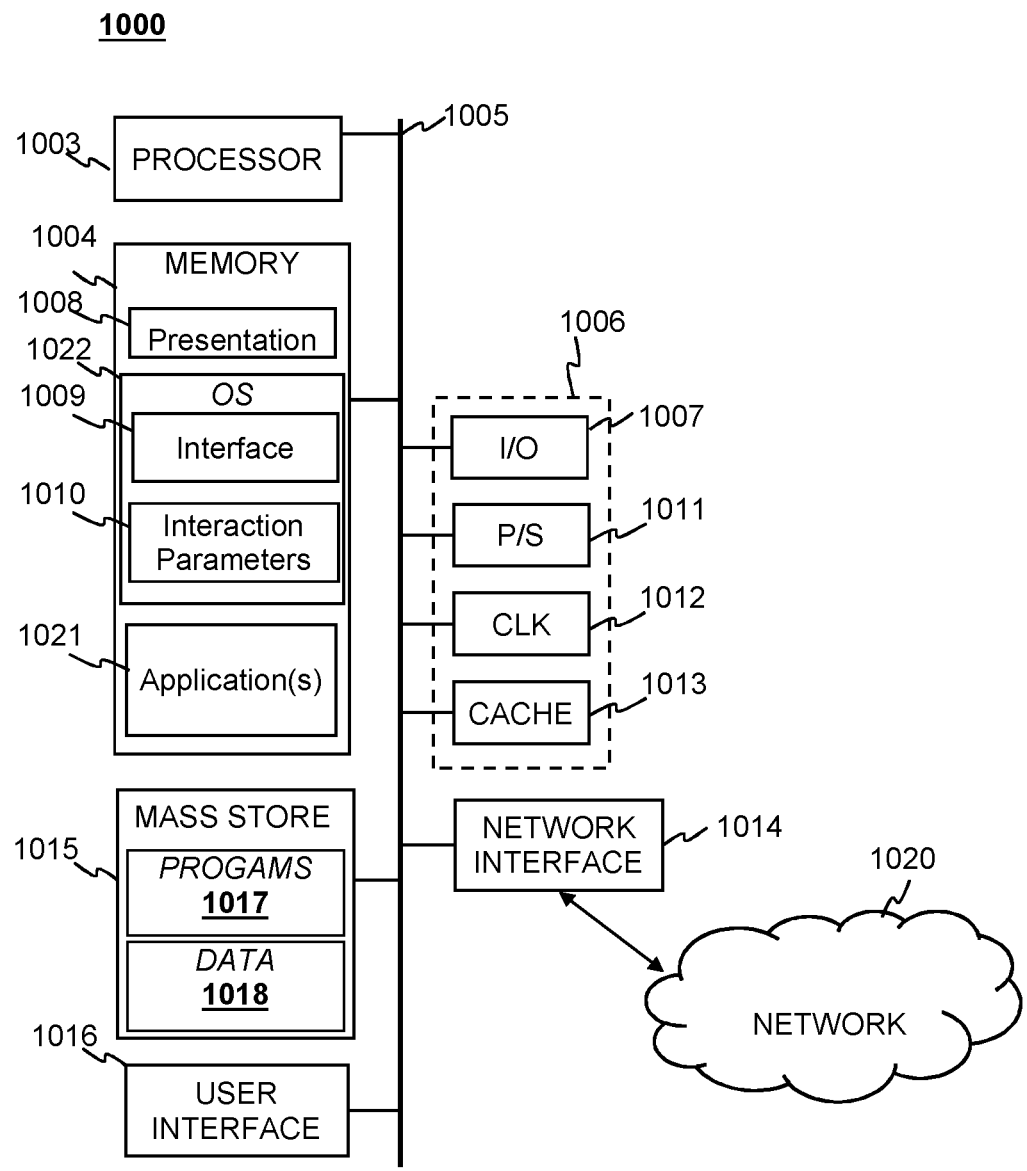
FIG. 10 is a system diagram depicting a system for viewer interaction according to an aspect of the present disclosure.

FIG. 10 is a block diagram depicting a system for viewer interaction according to an aspect of the present disclosure. By way of example, and not by way of limitation, according to aspects of the present disclosure, the system 1000 may be an embedded system, mobile phone, personal computer, tablet computer, portable game device, workstation, game console, and the like.

The system 1000 generally includes a central processor unit (CPU) 1003, and a memory 1004. The system 1000 may also include well-known support functions 1006, which may communicate with other components of the system, e.g., via a data bus 1005. Such support functions may include, but are not limited to, input/output (I/O) elements 1007, power supplies (P/S) 1011, a clock (CLK) 1012 and cache 1013.

The system 1000 includes a mass storage device 1015 such as a disk drive, CD-ROM drive, flash memory, solid state drive (SSD), tape drive, or the like to provide non-volatile storage for programs and/or data. The system 1000 may also optionally include a user interface unit 1016 to facilitate interaction between the system 1000 and a user. The user interface 1016 may include a keyboard, mouse, joystick, light pen, or other device that may be used in conjunction with a graphical user interface (GUI). The system 1000 may also include a network interface 1014 to enable the device to communicate with other devices over a network 1020. The network 1020 may be, e.g., a local area network (LAN), a wide area network such as the internet, a personal area network, such as a Bluetooth network or other type of network. These components may be implemented in hardware, software, or firmware, or some combination of two or more of these.

The CPU 1003 may include one or more processor cores, e.g., a single core, two cores, four cores, eight cores, or more. In some implementations, the CPU 1003 may include a GPU core or multiple cores of the same Accelerated Processing Unit (APU). The memory 1004 may be in the form of an integrated circuit that provides addressable memory, e.g., random access memory (RAM), dynamic random-access memory (DRAM), synchronous dynamic random-access memory (SDRAM), and the like. The main memory 1004 may include application(s) 1021 used by the processor 1003 to generate for example, a chat program internet browser, video game, movie etc. The main memory 1004 may also include an operating system (OS) 1022 the operating system may run over a hardware abstraction layer as depicted in FIG. 5. As discussed with FIG. 5 the Operating system may include an interaction interface 1009 that uses and/or generates interaction parameters 1010 as components in screen sharing plus. The interaction parameters 1010 may be stored in the memory 1004 or cache 1013. Additionally, the Memory 1004 may include a media presentation 1008 for example and without limitation a video game, a movie, a TV show, a streamed video or a picture. The OS layer interaction interface and interaction parameters provides application and media presentation agnostic viewer interactions and a reduced latency interactions than current application layer user interaction programs because the interactions operate at a lower system layer than the media presentation or the application.

According to aspects of the present disclosure the processor 1003 may carry out connection and viewer interaction, e.g., as discussed above with respect to FIGS. 6, 7 and 8, these methods may be loaded into memory 1004 as part of the OS 1022. The processor 1003 may generate one or more interaction parameters 1010 that may be sent over a network 1020 to a broadcasting device using the network interface 1014 and receive an image frame of a media presentation 1008 from a broadcasting device. The network interface 1014 may also receive interaction parameters 1010 from a viewing device and may stream image frames from a media presentation 1008 to a viewing device.

The Mass Storage 1015 may contain Application or Programs 1017 that are loaded to the main memory 1004 when processing begins on the application 1023. Additionally, the mass storage 1015 may contain data 1018 used by the processor during start up to load the OS 1009.

As used herein and as is generally understood by those skilled in the art, an application-specific integrated circuit (ASIC) is an integrated circuit customized for a particular use, rather than intended for general-purpose use.

As used herein and as is generally understood by those skilled in the art, a Field Programmable Gate Array (FPGA) is an integrated circuit designed to be configured by a customer or a designer after manufacturing—hence "field-programmable". The FPGA configuration is generally specified using a hardware description language (HDL), similar to that used for an ASIC.

As used herein and as is generally understood by those skilled in the art, a system on a chip or system on chip (SoC or SOC) is an integrated circuit (IC) that integrates all components of a computer or other electronic system into a single chip. It may contain digital, analog, mixed-signal, and often radio-frequency functions—all on a single chip substrate. A typical application is in the area of embedded systems.

A typical SoC includes the following hardware components:

One or more processor cores (e.g., microcontroller, microprocessor, or digital signal processor (DSP) cores.

Memory blocks, e.g., read only memory (ROM), random access memory (RAM), electrically erasable programmable read-only memory (EEPROM) and flash memory.

Timing sources, such as oscillators or phase-locked loops.

Peripherals, such as counter-timers, real-time timers, or power-on reset generators.

External interfaces, e.g., industry standards such as universal serial bus (USB), FireWire, Ethernet, universal asynchronous receiver/transmitter (USART), serial peripheral interface (SPI) bus.

Analog interfaces including analog to digital converters (ADCs) and digital to analog converters (DACs).

Voltage regulators and power management circuits.

These components are connected by either a proprietary or industry-standard bus. Direct Memory Access (DMA) controllers route data directly between external interfaces and memory, bypassing the processor core and thereby increasing the data throughput of the SoC.

A typical SoC includes both the hardware components described above, and executable instructions (e.g., software or firmware) that controls the processor core(s), peripherals, and interfaces.

Aspects of the present disclosure allow for enhanced remote interaction among players of video games. Various implementations discussed herein go beyond allowing players to share what is present on their respective screens. Such implementations additionally allow viewer interactions to be displayed directly on a broadcaster's media presentation with low latency.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for viewer interaction with streaming media on a broadcasting device, comprising:
    displaying a scene from a media presentation wherein the broadcasting device includes an operating system level broadcaster interface overlay;
    generating an image frame from the scene from the media presentation;
    sending the image frame from the scene from the media presentation to a viewing device;
    receiving viewer interaction parameters;
    displaying a viewer interaction over a subsequent scene from the media presentation with the operating system level broadcaster interface overlay using the viewer interaction parameters, wherein the viewer interaction parameters include an interaction location;
    wherein the viewer interaction parameters include a transform for the interaction location used to transform a location of the viewer interaction from a resolution at a viewer's device to a resolution at the broadcasting device.

2. The method for viewer interaction of claim 1 wherein the viewer interaction parameters include an interaction type.

3. The method for viewer interaction of claim 1 wherein the viewer interaction parameters include data for display of an emoticon or emoji in the operating system level broadcaster interface overlay.

4. The method for viewer interaction of claim 1 wherein the viewer interaction parameters include data for display of a free-form line, rectangle, circle, or ovoid, in the operating system level broadcaster interface overlay.

5. The method for viewer interaction of claim 1 wherein the viewer interaction parameters include data for display of a highlighted area, cursor, arrow, or a text comment in the operating system level broadcaster interface overlay.

6. The method for viewer interaction of claim 1 wherein the viewer interaction parameters include data for enlarging a portion of the scene of the media presentation in the operating system level broadcaster interface overlay.

7. The method for viewer interaction of claim 1 further comprising establishing viewer interaction limitations with the operating system level broadcaster interface overlay.

8. The method of claim 1, wherein the operating system level broadcaster interface overlay includes information that is not included in the image sent to the viewing device.

9. A system for viewer interaction with streaming media, comprising:
- a processor;
- a memory coupled to the processor;
- non-transitory instructions embodied in the memory that when executed by the processor cause the processor to implement the method for viewer interaction with streaming media on a broadcasting device comprising:
  - displaying a scene from a media presentation wherein the broadcasting device includes an operating system level broadcaster interface overlay;
  - generating an image frame from the scene from the media presentation;
  - sending the image frame from the scene from the media presentation to a viewing device;
  - receiving viewer interaction parameters;
  - displaying a viewer interaction over a subsequent scene from the media presentation with the operating system level broadcaster interface overlay using the viewer interaction parameters, wherein the viewer interaction parameters include an interaction location;
  - wherein the viewer interaction parameters include a transform for the interaction location used to transform a location of the viewer interaction from a resolution at a viewer's device to a resolution at the broadcasting device.

10. A method for viewer interaction with streaming media on a viewing device comprising:
- requesting a connection with a broadcasting device;
- receiving an image frame from a media presentation from the broadcasting device;
- generating an operating system level viewer interface overlay over the image frame;
- displaying the image frame from the media presentation;
- generating viewer interaction parameters from a viewer interaction with the operating system level viewer interface overlay;
- sending the viewer interaction parameters to the broadcasting device, wherein the viewer interaction parameters include an interaction location;
- wherein the viewer interaction parameters include a transform for the interaction location used to transform a location of the viewer interaction from a resolution at the viewing device to a resolution at the broadcasting device.

11. The method for viewer interaction of claim 10 wherein the viewer interaction parameters include an interaction type.

12. The method for interaction of claim 10 wherein the viewer interaction parameters include data for display of an emoticon or emoji in the operating system level viewer interface overlay.

13. The method for interaction of claim 10 wherein the viewer interaction parameters include data for display of a free-form line, rectangle, circle, or ovoid, in the operating system level viewer interface overlay.

14. The method for interaction of claim 10 wherein the viewer interaction parameters include data for display of a highlighted area, cursor, arrow, or a text comment in the operating system level viewer interface overlay.

15. The method for interaction of claim 10 wherein the viewer interaction parameters include data for enlarging a portion of the scene of the media presentation in the operating system level viewer interface overlay.

16. The method for interaction of claim 10 further comprising receiving viewer interaction limitations from the broadcasting device.

17. The method for interaction of claim 10 wherein generating viewer interaction parameters includes capturing an interaction type and the interaction location from a location of the viewer interaction from an area of a display screen of the viewing device.

18. A system for viewer interaction with streaming media, comprising:
- a processor;
- a memory coupled to the processor;
- non-transitory instructions embodied in the memory that when executed by the processor cause the processor to implement the method for interaction with streaming media on a viewing device comprising:
  - requesting a connection with a broadcasting device;
  - receiving an image frame from a media presentation from the broadcasting device;
  - generating an operating system level viewer interface overlay over the image frame from the media presentation;
  - displaying the image frame from the media presentation;
  - generating viewer interaction parameters from a viewer interaction with the operating system level viewer interface overlay;
  - sending viewer interaction parameters to the broadcasting device, wherein the viewer interaction parameters include an interaction location;
  - wherein the viewer interaction parameters include a transform for the interaction location used to transform a location of the viewer interaction from a resolution at the viewing device to a resolution at the broadcasting device.

* * * * *